UNITED STATES PATENT OFFICE.

ARCHIBALD R. MILLER, OF HELENSBURGH, SCOTLAND.

CLINOMETER.

1,277,102.

Specification of Letters Patent. Patented Aug. 27, 1918.

Application filed December 27, 1917. Serial No. 209,067.

*To all whom it may concern:*

Be it known that I, ARCHIBALD RUSSELL MILLER, a subject of the King of the United Kingdom of Great Britain and Ireland, and residing at Helensburgh, Dumbartonshire, Scotland, have invented a certain new and useful Improvement in Clinometers, of which the following is a specification.

The subject of this invention is an instrument applicable to air-craft and sea-craft or as a clinometer generally, but designed primarily for indicating visually to the pilot or observer on an aeroplane or the like departure from normal level of the aeroplane or the like at any instant.

An instrument according to the invention comprises a closed box or casing containing liquid, and preferably mounted to swivel in bearings in a bracket attachable, say, to any convenient part of the aeroplane within the field of vision of the pilot or of the observer, said box containing a buoyant compartment or chamber which contains, say, atmospheric air or gas, and mounted on an axis of rotation coaxial with such cylinder in such manner that the buoyant compartment will maintain a uniform position of level irrespective of any angular movements of the box. By means of a dial or pointer applied or attached to the compartment, and observable through a circular glazed opening in the box, the normal position of level of the aeroplane or the like can be ascertained at any instant. Suitable marks or scale divisions may be applied around the said glazed opening in the box, by comparison of which with the dial or pointer of the buoyant compartment variation or departure from normal level of the aeroplane or the like can be visually measured.

The box is desirably suspended so as always to maintain an approximate vertical position at right angles to the line of the suspension points.

The liquid contained within the box is preferably one having a low freezing point, such as an alcohol or a mixture of an alcohol and glycerin.

Figure 1:
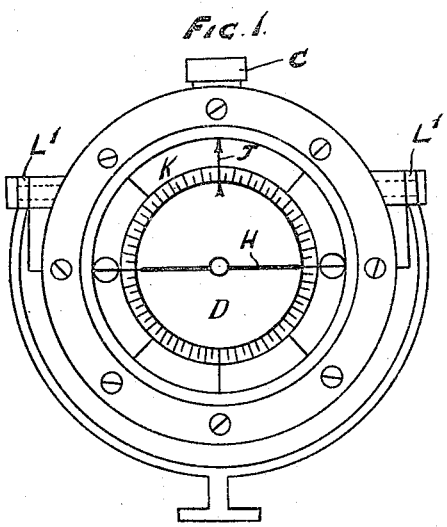
Figure 2:
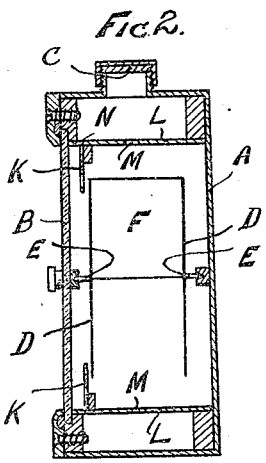

The invention is illustrated by way of example in the accompanying drawings in which Figure 1 is a front elevation and Fig. 2 a vertical section at right angles thereto, the support not being shown.

As shown, A denotes the outer box or casing having a glazed front B and a filling aperture adapted to be closed by a screw cap or plug C after admission of liquid into the box A. Visible through the glazed opening and concentric therewith is a fixed circular scale K. D, D denote two disks which, in conjunction with an intermediate semi-cylindrical section, form a hermetically sealed compartment F containing air or gas, said disks and compartment being of light material and having axially disposed pivots E, E working in bearings as shown. The buoyant compartment constitutes an indicator the disk face of which nearest the glazed front B is preferably colored white and inscribed with a straight black line or pointer H disposed horizontally and serving to denote normal level; or a vertical pointer or indicating mark may be provided on the front disk D such as shown at the bottom of the arrow mark J on the scale.

Fixed within the box A is a cylindrical shell L having two small perforations M to permit passage of liquid. The shell L is intended to be completely submerged by the liquid to prevent any surface action of the liquid disturbing the buoyant compartment, and is spaced from the wall of the box A to afford a space which allows for expansion and contraction of the liquid and air, without interference with the volume of liquid in the confined space containing the buoyant compartment. A small aperture N may be provided in the shell L to allow escape of any air which might on occasion be present at the front of the scale.

The box A is suspended by a bracket preferably of segmental form, on side pivots L', L', the pivots being situated above the center of gravity of the case and contents.

In use, the instrument is fixed to the body of the aeroplane (or other object) when the latter is at rest in a position of normal level by means of the bracket or other attachment; in a position to record either (1) transverse or (2) longitudinal level, and departures therefrom; one instrument being required for each such purpose. The bracket, or other attachment, being fixed to the body of the aeroplane, will move with the latter, and the box must, therefore, conform to any motion which is at right angles to the axis of the disk indicator.

The disk indicator, being on a free axis, will, by reason of the upward thrust of the liquid on the air compartment, retain a normal level position, irrespective of angular movements of the box. Thus, any deflection from normal level will be visible on comparison of the inscribed line or pointer of the disk indicator with the circular scale.

The effect of centrifugal force is reduced to a minimum, error arising therefrom being very slight and immaterial for practical purposes.

The disk indicator will not be affected by extraneous vibration or shock, owing to the buoyant tension thereon, and also to the cushioning action of the liquid.

The interior of the box is entirely smooth, so that frictional drag and resistance are reduced to a minimum, and any such effect will be absorbed and nullified by the extent of the space occupied by the liquid in contact with the moving surfaces.

The pointer and scale may be luminous so as to be visible in the dark.

What I claim is:—

The herein described clinometer comprising, in combination, a box containing liquid, a buoyant hermetically sealed compartment of the form of a segment of a cylinder mounted upon and free to rotate within said box on an axis coincident with that of said cylinder, said compartment being completely submerged in liquid contained within said box, said compartment and said box provided with coöperating indicating devices, and means for protecting said compartment from surface action of the liquid.

In testimony whereof I have signed my name to this specification in the presence of two subscribing witnesses.

A. R. MILLER.

Witnesses:
HENRY MASON,
FLORENCE HOUSTON.

Copies of this patent may be obtained for five cents each, by addressing the "Commissioner of Patents, Washington, D. C."